(12) United States Patent
Sutton

(10) Patent No.: US 7,713,417 B2
(45) Date of Patent: May 11, 2010

(54) METHOD FOR WASTEWATER TREATMENT WITH RESOURCE RECOVERY AND REDUCED RESIDUAL SOLIDS GENERATION

(75) Inventor: Paul M. Sutton, Enfield, NH (US)

(73) Assignee: Envirogen Technologies, Inc., Ewing, NJ (US)

( * ) Notice: Subject to any disclaimer, the term of this patent is extended or adjusted under 35 U.S.C. 154(b) by 85 days.

(21) Appl. No.: 11/966,267

(22) Filed: Dec. 28, 2007

(65) Prior Publication Data
US 2008/0223783 A1 Sep. 18, 2008

Related U.S. Application Data

(60) Provisional application No. 60/918,551, filed on Mar. 16, 2007.

(51) Int. Cl.
*C02F 3/00* (2006.01)
(52) U.S. Cl. .......................... 210/624; 210/630
(58) Field of Classification Search .......... 210/620–631
See application file for complete search history.

(56) References Cited

U.S. PATENT DOCUMENTS

| | | | |
|---|---|---|---|
| 3,959,125 A | 5/1976 | Teletzke |
| 4,029,575 A | 6/1977 | Bykowski et al. |
| 4,042,494 A | 8/1977 | Stoyer |
| 4,246,099 A | 1/1981 | Gould et al. |
| 4,321,141 A | 3/1982 | Messing |
| 4,781,836 A | 11/1988 | Thiele et al. |
| 4,885,094 A | 12/1989 | Srinivasan et al. |
| 5,057,220 A | 10/1991 | Harada et al. |
| 5,116,506 A | 5/1992 | Williamson et al. |
| 5,254,253 A | 10/1993 | Behmann |
| 5,254,254 A | 10/1993 | Shin et al. |
| 5,500,123 A | 3/1996 | Srivastava |

(Continued)

FOREIGN PATENT DOCUMENTS

JP 2006088014 A 4/2006

(Continued)

OTHER PUBLICATIONS

International Search Report dated Oct. 6, 2008, application No. PCT/US2008/003452.

(Continued)

*Primary Examiner*—Chester T Barry
(74) *Attorney, Agent, or Firm*—RatnerPrestia

(57) ABSTRACT

A wastewater treatment system is provided including an aerobic membrane bioreactor and an anaerobic digester system connected to receive wasted solids continuously from the aerobic membrane bioreactor and also connected to return effluent from the anaerobic digester system continuously to the aerobic membrane bioreactor. Further, a process is provided for treating wastewater including the step of wasting a volume fraction of organic cell mass from an aerobic membrane bioreactor to an anaerobic digester system and maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occurs. The system and process may further include optional pretreatment and/or phosphorus and/or nitrogen removal downstream of the membrane bioreactor system.

19 Claims, 6 Drawing Sheets

U.S. PATENT DOCUMENTS

| | | | |
|---|---|---|---|
| 5,527,464 | A | 6/1996 | Bartha et al. |
| 5,558,774 | A | 9/1996 | Tonelli et al. |
| 5,736,047 | A | 4/1998 | Ngo |
| 5,744,037 | A | 4/1998 | Fujimura et al. |
| 5,776,344 | A | 7/1998 | McCarty et al. |
| 5,861,095 | A | 1/1999 | Vogel et al. |
| 5,942,108 | A | 8/1999 | Yang |
| 6,030,533 | A | 2/2000 | Karamanev et al. |
| 6,039,873 | A | 3/2000 | Stahler |
| 6,235,196 | B1 | 5/2001 | Zhou et al. |
| 6,444,124 | B1 * | 9/2002 | Onyeche et al. ............. 210/603 |
| 6,444,125 | B2 | 9/2002 | Han |
| 6,491,820 | B2 | 12/2002 | Held et al. |
| 6,517,723 | B1 | 2/2003 | Daigger et al. |
| 6,558,549 | B2 | 5/2003 | Cote et al. |
| 6,585,895 | B2 | 7/2003 | Smith et al. |
| 6,592,763 | B1 | 7/2003 | Benedictus et al. |
| 6,605,219 | B2 | 8/2003 | Lambert |
| 6,673,243 | B2 | 1/2004 | Srinivasan et al. |
| 6,692,642 | B2 | 2/2004 | Josse et al. |
| 6,709,593 | B2 | 3/2004 | Lorenz |
| 6,723,244 | B1 | 4/2004 | Constantine |
| 6,730,225 | B1 | 5/2004 | Duke et al. |
| 6,743,362 | B1 | 6/2004 | Porteous et al. |
| 6,758,972 | B2 | 7/2004 | Vriens et al. |
| 6,863,817 | B2 | 3/2005 | Liu et al. |
| 6,893,566 | B2 | 5/2005 | Fassbender |
| 6,926,830 | B2 | 8/2005 | Ho et al. |
| 6,936,170 | B2 | 8/2005 | Shieh et al. |
| 7,005,068 | B2 | 2/2006 | Hoffland |
| 7,087,170 | B2 | 8/2006 | You et al. |
| 7,147,777 | B1 | 12/2006 | Porteous |
| 7,147,778 | B1 | 12/2006 | DiMassimo et al. |
| 7,172,699 | B1 | 2/2007 | Trivedi et al. |
| 2002/0185435 | A1 | 12/2002 | Husain et al. |
| 2003/0178364 | A1 | 9/2003 | Yum et al. |
| 2004/0065611 | A1 | 4/2004 | Jones |
| 2004/0144728 | A1 | 7/2004 | Moller et al. |
| 2005/0011829 | A1 | 1/2005 | Dong et al. |
| 2005/0016919 | A1 | 1/2005 | Hagino et al. |
| 2005/0023202 | A1 | 2/2005 | Horng et al. |
| 2005/0045557 | A1 * | 3/2005 | Daigger et al. ............. 210/605 |
| 2005/0131086 | A1 | 6/2005 | Dancuart Kohler et al. |
| 2005/0194311 | A1 | 9/2005 | Rozich |
| 2005/0274668 | A1 | 12/2005 | Lee |
| 2006/0000785 | A1 | 1/2006 | Moller |
| 2006/0096918 | A1 | 5/2006 | Semmens |
| 2006/0163155 | A1 | 7/2006 | Chauzy et al. |
| 2006/0169636 | A1 | 8/2006 | Devine |
| 2006/0201876 | A1 | 9/2006 | Jordan |
| 2006/0243664 | A1 | 11/2006 | Pollock |
| 2006/0249449 | A1 * | 11/2006 | Nakhla et al. ............... 210/605 |
| 2006/0272198 | A1 | 12/2006 | Yoon et al. |
| 2007/0012620 | A1 | 1/2007 | Murphy |

FOREIGN PATENT DOCUMENTS

| | | | |
|---|---|---|---|
| WO | WO 02/10077 | A1 | 2/2002 |
| WO | WO 2004/050566 | A | 6/2004 |
| WO | WO 2005/100265 | A | 10/2005 |

OTHER PUBLICATIONS

Ng, How Y., et al., "Membrane fouling of submerged membrane bioreactors: impact of mean cell residence time and the contributing factors", Environ. Sci. Technol., 2006, pp. 2706-2713, vol. 40, issue 8, ACS Publications (w/Abstract).

Atkinson, S., "Novel membrane-based technologies to treat water", Membrane Technology, 2005, pp. 9-10, issue 10, Elsevier Ltd. (w/Abstract).

Drews, A., et al., "Process improvement by application of membrane bioreactors", Chem. Eng. Res. Des., 2005, pp. 276-284, vol. 83, issue A3, Institution of Chemical Engineers (w/Abstract).

Wang Ying, et al., "Nitrogen and carbon removals from food processing wastewater by an anoxic/aerobic membrane bioreactor", Process Biochem., 2005, pp. 1733-1739, vol. 40, issue 5, Elsevier Ltd. (Abstract only).

Zhang Daijun, et al., "The integration of methanogensis with simultaneous nitrification and denitrification in a membrane bioreactor", Process Biochem, 2005, pp. 541-547, vol. 40, issue 2, Elsevier Ltd. (Abstract only).

Ghosh, S., et al., "Removal of carbonaceous and nitrogenous pollutants from a synthetic wastewater using membrane-coupled bioreactor", J. of Indust. Microbiol. Biotechnol., 2004, pp. 353-361, vol. 31, issue 8, Springer Berlin (Abstract only).

Adam, C., "Enhanced elimination of phosphorus and nitrogen from wastewaters employing a membrane activated sludge process with downstream denitrification", Fortschr.-Ber. VDI, Reihe 15, 2004, pp. I-X, 1-123, vol. 250 (Abstract only).

International Preliminary Report on Patentability and Written Opinion in PCT/US2008/003452, dated Oct. 1, 2009 (8 pages), The International Bureau of WIPO.

* cited by examiner

METHOD FOR WASTEWATER TREATMENT WITH RESOURCE RECOVERY AND REDUCED RESIDUAL SOLIDS GENERATION

This application claims priority to U.S. Provisional Patent Application Ser. No. 60/918,551 filed Mar. 16, 2007, which is incorporated herein by reference in its entirety.

FIELD OF THE INVENTION

The invention relates to biological wastewater treatment systems designed to provide removal of organic and inorganic compounds. More specifically, the invention relates to biological wastewater treatment systems including aerobic membrane bioreactor systems for providing removal of organic and inorganic compounds from, for example, sanitary, municipal and industrial wastewaters.

BACKGROUND OF THE INVENTION

Sanitary or municipal wastewaters and many industrial wastewaters are generally characterized as having high concentrations of inert and organic particulate matter. Typically, this particulate matter is measured as total suspended solids (TSS) and particulate carbonaceous biochemical oxygen demand (CBOD), respectively. These wastewaters further typically include soluble organic matter, typically measured as soluble CBOD, soluble or particulate organic nitrogen compounds and ammonia, typically measured as total kjeldahl/nitrogen (TKN), inorganic nitrogen compounds (nitrites and nitrates), and organic and inorganic phosphorus compounds, typically measured as total phosphorus (TP). The sum of TKN, nitrites and nitrates represents total nitrogen (TN).

Increasingly, many countries throughout the world, including the United States of America, are imposing more stringent effluent discharge regulations and in many cases are requiring increased or near complete removal of CBOD, TSS, TN and/or TP from these wastewaters.

Compliance with these stringent effluent discharge regulations will require modifications and/or equipment additions to existing treatment systems, or incorporation of such modifications or equipment additions into the design of new treatment facilities. These modifications and/or equipment additions typically are capital cost intensive and generally result in significant increases in operating costs due to increased energy and chemical usage, generation of additional residuals requiring disposal (e.g., increased solids generation due to chemical addition to achieve complete TP removal), and an increase in the manpower costs for operation and maintenance of these increasingly larger and more complex treatment systems.

To-date, in many cases where plants have been upgraded to meet stringent effluent nutrient requirements (i.e., TN and TP concentration values), performance results have been variable. Accordingly, there remains a need for improved biological wastewater treatment systems designed to provide removal of organic and inorganic compounds.

SUMMARY OF THE INVENTION

In one aspect, the invention provides a wastewater treatment system including an aerobic membrane bioreactor and an anaerobic digester system. The anaerobic digester system is connected to directly receive wasted solids from the aerobic membrane bioreactor. The anaerobic digester system is also connected to return effluent from the anaerobic digester system directly to the aerobic membrane bioreactor.

In another aspect, the invention provides a process for treating wastewater including the step of wasting a volume fraction of organic cell mass from an aerobic membrane bioreactor to an anaerobic digester system. This aspect further includes the step of maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occurs.

In yet another aspect, the invention provides a method for retrofitting a wastewater treatment system for enhanced removal of organic and inorganic compounds having an aerobic membrane bioreactor. The method includes the steps of connecting an anaerobic digester system to an aerobic membrane bioreactor to directly receive wasted solids from the aerobic digester system and connecting the anaerobic digester to the aerobic membrane bioreactor to return a bioreactor return stream directly to the aerobic membrane bioreactor.

In still another aspect, the invention provides a wastewater treatment system including an aerobic membrane bioreactor and an anaerobic digester system. The anaerobic digester system is connected to continuously receive wasted solids from the aerobic membrane bioreactor. The anaerobic digester system is also connected to return effluent from the anaerobic digester system continuously to the aerobic membrane bioreactor.

The invention further provides embodiments according to these aspects for affording near complete treatment of the wastewater and removal of further undesirable contaminants. In these embodiments, the invention provides unit processes or process steps comprising phosphorus removal and/or ammonia removal. The phosphorus removal and/or ammonia removal may further include embodiments in which products are recovered from the respective phosphorus and ammonia removal unit processes or process steps.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing, in which like reference numerals refer to similar features in the respective figures, are the following figures.

DETAILED DESCRIPTION OF THE INVENTION

The invention is best understood from the following detailed description when read in connection with the accompanying drawing, which shows exemplary embodiments of the invention selected for illustrative purposes. The invention will be illustrated with reference to the Figures. Such Figures are intended to be illustrative rather than limiting and are included herewith to facilitate the explanation of the present invention.

Figure 1:
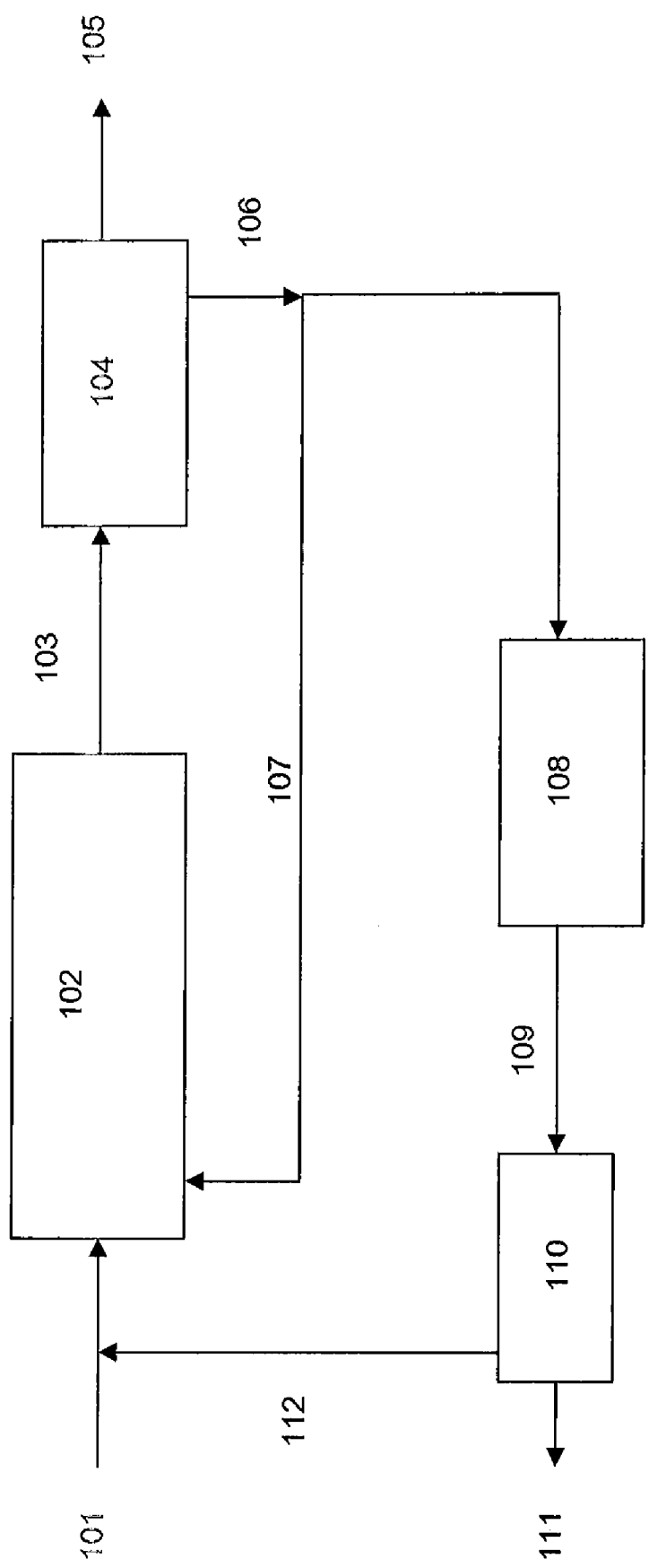
FIG. 1 is a simplified diagram of a wastewater treatment system designed for secondary treatment of wastewater flows.

Biological treatment can be used as an effective secondary treatment (e.g., effluent CBOD or $CBOD_5$ and TSS of 30 and 30 mg/l, respectively) of municipal wastewater and industrial wastewaters containing biodegradable organics. The biological system shown in FIG. 1 is designed to achieve such secondary treatment of smaller, municipal wastewater flows (e.g., flow rate less than 5 mgd). As shown in FIG. 1, wastewater stream 101, following screening and grit removal (not shown), is treated in an aerobic suspended growth activated sludge bioreactor 102 for CBOD removal. Reactor effluent 103 is then sent to a secondary clarifier 104 for TSS removal. After treatment in the secondary clarifier 104, the wastewater is disinfected by conventional disinfecting methods, as would be known to one of ordinary skill in the art, resulting in product stream 105.

Solids recovered from the secondary clarifier 104 are recycled via solids recycle stream 106, a portion of which is recycled back to the bioreactor 102 via 107. The remaining solids are introduced, via a solids wasting stream, into aerobic digester 108 where the solids are stabilized and volatile organic solids are reduced. The aerobically digested solids from aerobic digester 109 are further treated by solids dewatering system 110 to concentrate the solids. Solids removed from the aerobic digester effluent 109 in solids stream 111 are collected and disposed. Stream 112 is recovered from solids dewatering system 110 and returned back to and mixed with the wastewater feed stream 101.

As shown in FIG. 1, the secondary treatment system purposely consists of only a few unit processes each requiring minimal instrumentation and control translating to a relatively low capital cost. The simplistic characteristics of the system translate to a relatively low manpower cost for operation and maintenance.

It is recognized, however, that it may be necessary in some circumstances to alter the biological secondary treatment system flow sheet to achieve near complete CBOD, TSS, TN and TP removal (e.g., effluent $CBOD_5$, TSS, TN and TP of 5, 5, 3 and 0.1 mg/l, respectively). For example, it may be necessary in some circumstances to alter the biological secondary treatment system flow sheet shown in FIG. 1 by adding tankage, equipment components and chemicals (e.g., tertiary clarification or sand filtration, with chemical addition) to achieve near complete removal of TN and TP.

Tankage is therefore optionally added and/or the biological reactor is optionally modified to increase the biomass inventory to achieve ammonia oxidation to nitrate (e.g., nitrification). In addition, tankage, equipment components and chemicals are optionally added, and the biological reactor is optionally modified to achieve nitrate reduction to nitrogen gas (e.g., denitrification utilizing wastewater CBOD as internal carbon source plus an external carbon source such as methanol is added to one or more downstream denitrification steps). Further, tankage and equipment components are optionally added to achieve phosphorus removal by biological methods (e.g., enhanced phosphorus uptake by phosphorus accumulating organisms or PAOs) and/or by physical-chemical methods with chemical addition (e.g., tertiary sand filtration with chemical addition).

Figure 2:
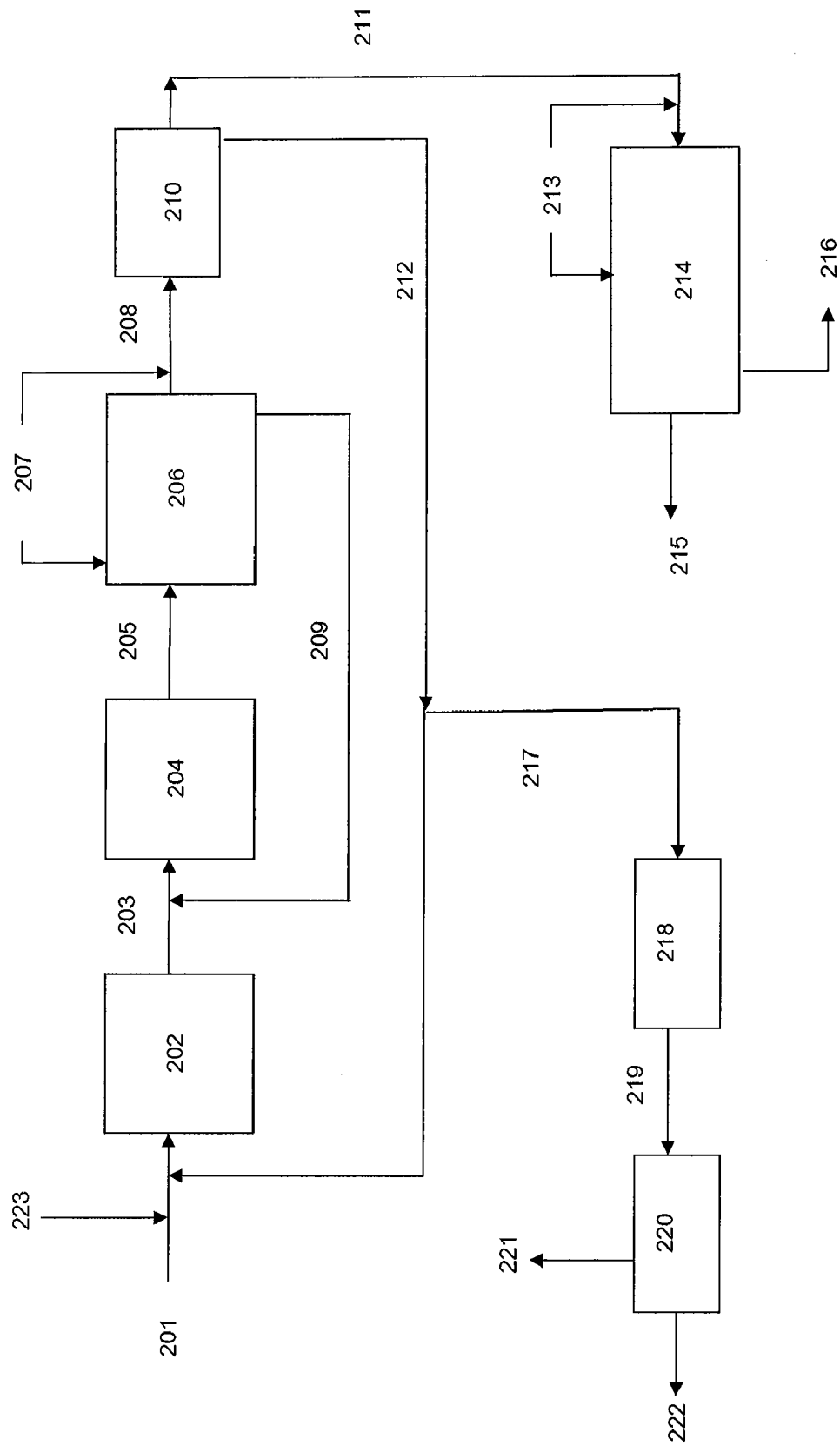
FIG. 2 is a simplified diagram of the wastewater treatment system of FIG. 1 upgraded to achieve improved or near complete CBOD, TSS, TN and TP removal.

The system shown in FIG. 2 represents an example of a secondary biological treatment system designed to handle smaller municipal wastewater flows (like that shown in FIG. 1) that has been modified to achieve near complete CBOD, TSS, TN and TP removal. As shown in FIG. 2, wastewater feed stream 201, following screening and grit removal (not shown), is fed to a first suspended growth bioreactor 202, which is operated under anaerobic conditions. From the anaerobic bioreactor 202, the anaerobic bioreactor effluent 203 is fed to another suspended growth bioreactor 204, which is operated under anoxic conditions. The anoxic bioreactor effluent 205 is then fed to yet another suspended growth bioreactor 206, this one operated under aerobic conditions. As shown in FIG. 2, chemical additives are introduced from a chemical addition source 207 directly into the aerobic bioreactor 206, and/or into the aerobic bioreactor effluent 208. Mixed-liquor, recovered from aerobic bioreactor 206, is recycled as mixed-liquor recycle stream 209 by being introduced into anaerobic bioreactor effluent stream 203.

Following treatment in the aerobic bioreactor 206, the aerobic bioreactor effluent 208 is fed to secondary and tertiary clarifier systems, designated in FIG. 2 as reference 210. Solids recovered from the clarifier systems 210 are recycled via solids recycle stream 212, in which a portion of the recycle stream 212 is recirculated back into wastewater feed stream 201 or into anaerobic bioreactor 202. The remaining portion is split into solids wasting stream 217 for further treatment in an aerobic digester 218. The aerobically digested solids from aerobic digester 218 are dewatered in solids dewatering system 220. Stream 221 is recovered from solids dewatering system 220 and returned back to the wastewater feed stream 201. Solids from the solids dewatering system 220 are removed in stream 222 and collected for disposal.

Effluent 211 from the clarifier systems 210, which contains a majority of inorganic matter, is fed to a multiple sand filtration system 214, where TSS, TN and TP are further removed. Chemical addition source 213 provides the chemical additives that may be required to achieve the requisite TSS, TN and TP removal. After treatment in multi-stage sand filtration system 214, stream 215, following disinfection, is discharged as the final effluent. In addition, backwash 216 from the sand filtration system 214 is returned to wastewater treatment feed stream 201 via return flow stream 223 for further treatment.

It should be noted that while FIG. 2 shows three separate bioreactors, namely anaerobic bioreactor 202, anoxic bioreactor 204, and aerobic bioreactor 206, these three treatment processes are optionally constructed in one vessel having three distinct zones. And as suggested by FIG. 2 and the foregoing discussion, this system consists of a number of treatment steps and corresponding unit processes, each with its own instrumentation and control requirements and a piping and pumping network with a number of locations where chemicals are optionally added.

According to preferred embodiments of this invention, the capital costs of the system illustrated in FIG. 2, as well as the operating costs related to chemical requirements and the disposal of resulting solids, can be reduced. Also, the manpower costs for the operation and maintenance of the system illustrated in FIG. 2 can be reduced according to preferred embodiments of this invention.

Figure 3:
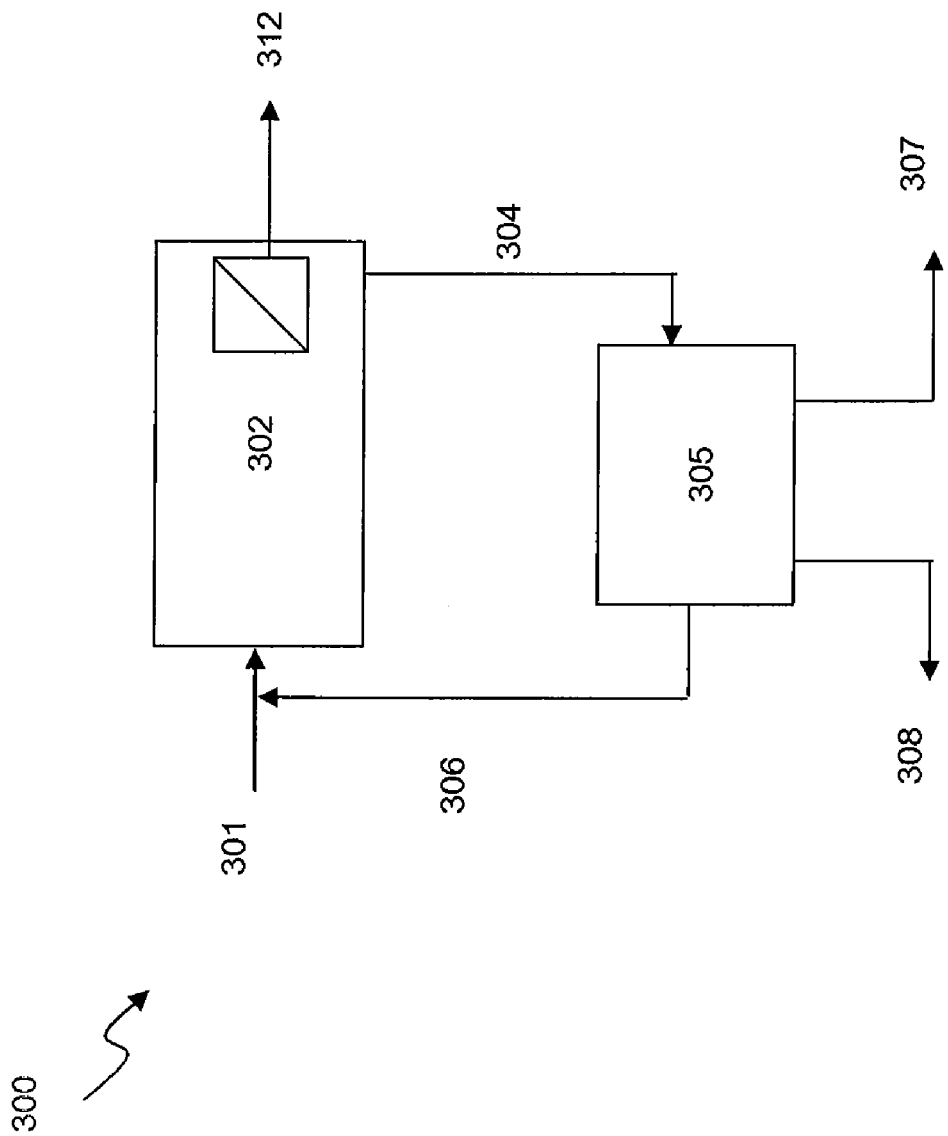
FIG. 3 is a simplified flow diagram of an embodiment of a wastewater treatment system according to exemplary aspects of the present invention.
Figure 4:
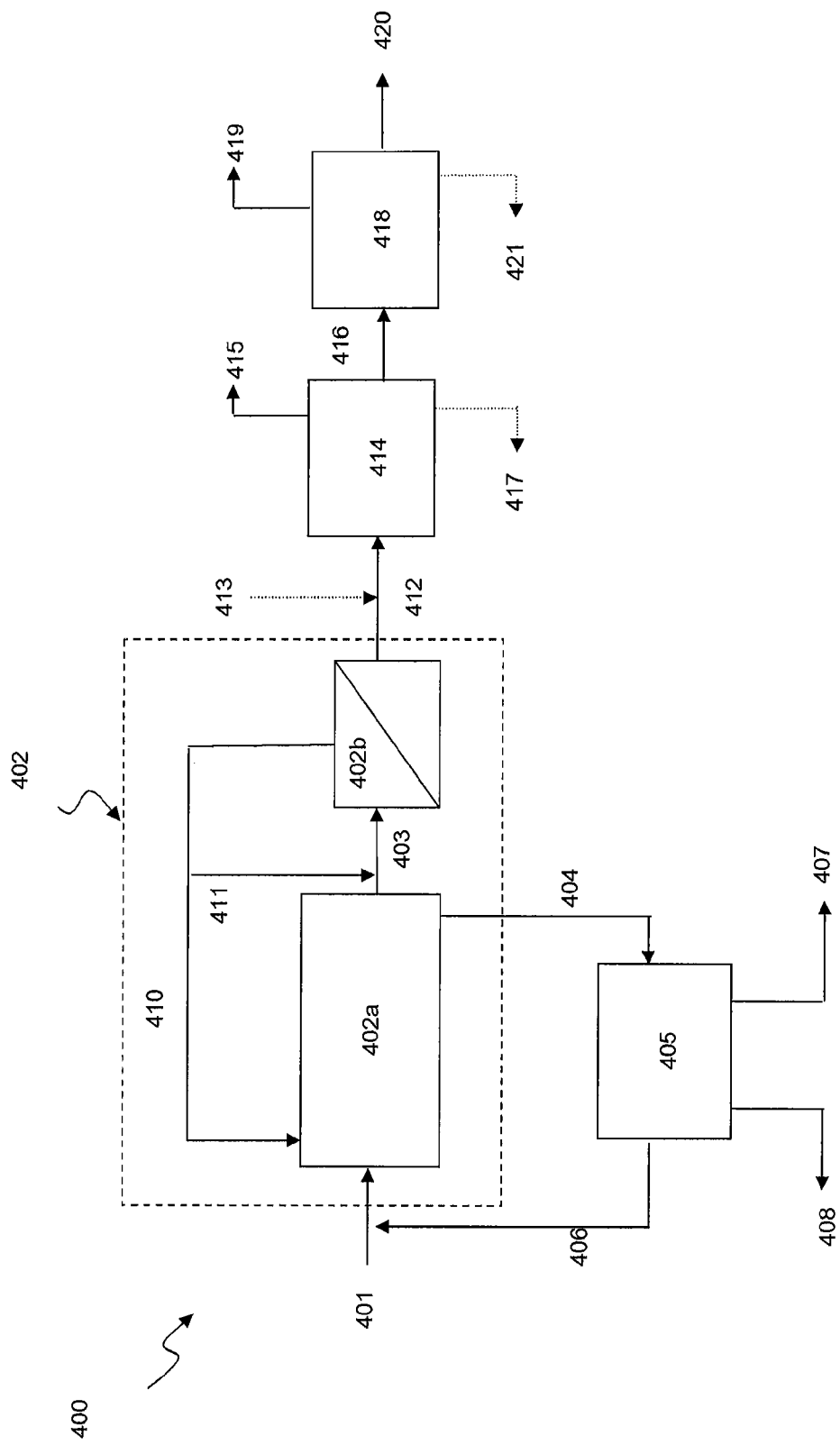
FIG. 4 is a simplified flow diagram of another embodiment of a wastewater treatment system according to exemplary aspects of the present invention.

The embodiments of the present invention illustrated in FIGS. 3 and 4 are simpler, more cost-effective treatment systems as compared to the treatment system shown in FIG. 1, yet they can provide near complete CBOD, TSS, TN and TP removal. Specifically, a system such as the exemplary embodiments illustrated in FIGS. 3 and 4 provides a high-performance energy efficient flow sheet characterized by resource recovery and minimal residual solids generation.

Generally, preferred embodiments of the invention provide a wastewater treatment system including a membrane bioreactor (MBR) connected to an anaerobic digester system. The MBR is configured to operate at a solids retention time (SRT) that is greater than a time needed to achieve growth of organisms suitable for converting CBOD into cell mass and less than a time at which substantial decay of the organisms occurs. The anaerobic digester system is connected to the MBR and receives wasted solids, such as biomass, from the MBR. The anaerobic digester system is configured to treat a volume fraction of wasted organic solids from the MBR, wherein the volume fraction of the wasted solids is an amount sufficient to maintain the minimum SRT. By controlling the amount of wasted solids from the MBR to the anaerobic digester system, stable biomass growth conditions are achieved.

For near complete wastewater treatment, in addition to the MBR and anaerobic digester system, the wastewater treatment system optionally includes a phosphorus removal-recovery system and an ammonia removal-recovery system.

Referring generally to FIGS. 3 and 4, in one preferred aspect, the invention provides a wastewater treatment system 300, 400 comprising an aerobic MBR 302, 402 and an anaerobic digester system 305, 405 connected to receive wasted solids from the aerobic MBR 302, 402, the anaerobic digester system also being connected to return effluent from the anaerobic digester system 305, 405 to the aerobic MBR 302, 402.

Optionally, the wastewater treatment system 300, 400 may include an aerobic MBR 302, 402 maintained at a minimum dissolved oxygen concentration of at least about 0.5 mg/l. The aerobic MBR 302, 402 may also comprise, as shown in FIG. 4, a membrane separator 402b external to the aerobic MBR 402a, such as a cross-flow filter. Alternatively, the MBR 302, 402 may comprise a membrane separator submerged or immersed in the liquid or mixed-liquor contents of the MBR, as shown schematically, for example, in FIG. 3, 302. The MBR 302, as illustrated in FIG. 3, however, also represents embodiments of a MBR system for which the membrane separator is provided external to the MBR. Exemplary membrane separators have an average pore size of at least about 0.01 microns.

The anaerobic digester system 305, 405 comprises an anaerobic digester system 305, 405 that receives wasted solids directly or indirectly from the aerobic MBR 302, 402. By use of the term "directly," it is intended that "directly" means that the wasted solids from the MBR are not further processed, with the exception of optionally being heated, before being introduced into the anaerobic digester system. Similarly, it also means that the digester system effluent directly returned to the MBR is also not further processed before being fed back to the MBR. The anaerobic digester system 305, 405 may also comprise an anaerobic digester system 305, 405 that is connected and/or configured to receive wasted solids either continuously, intermittently or discontinuously, from the aerobic MBR 302, 402. In one embodiment, the anaerobic digestion system 305, 405 comprises a single tank partitioned by baffles to promote plug flow hydraulic conditions.

The wastewater treatment system 300, 400, generally illustrated in FIGS. 3 and 4, may also optionally comprise a phosphorus removal and/or recovery system, as shown in FIG. 4, as 414 connected to receive treated wastewater from the aerobic MBR 402. This system 414 may comprise a physical-chemical unit process, such as a sand filter and a source of ferric chloride, ferrous sulphate, alum or other chemical solution to effect phosphorus precipitation, for example.

In addition, the wastewater treatment system 300, 400, generally illustrated in FIGS. 3 and 4, further may optionally comprise, as shown in FIG. 4, an ammonia removal and/or recovery system 418 connected to receive wastewater from the aerobic MBR 402. The ammonia removal and/or recovery system may comprise a physical-chemical unit process or a biological system, and may include an ion-exchange system or an air stripping-ammonia absorption system, for example.

The wastewater treatment system 300, 400 may also optionally include a wastewater pretreatment system (not shown) upstream of the aerobic MBR 302, 402. Pretreatment may comprise, for example, wastewater screening and grit removal.

Referring generally to FIGS. 3 and 4, in another aspect, the invention further provides a wastewater treatment system 300, 400 comprising the steps of wasting a volume fraction of organic cell mass from an aerobic MBR 302, 402 to an anaerobic digester system 305, 405 and maintaining a solids retention time (SRT) in the MBR 305, 405 that is (1) greater than a time needed to achieve growth of organisms suitable for converting carbonaceous biochemical oxygen demand (CBOD) into cell mass and (2) less than a time at which substantial decay of the organisms occurs.

The process optionally includes controlling the SRT in a range between about 1 to about 5 days, or in a range between about 1 to about 3 days. Moreover, the process may also include the steps of controlling a minimum dissolved oxygen concentration in the aerobic MBR 302, 402 of at least about 0.5 mg/l and/or maintaining the SRT to minimize ammonia oxidation in the aerobic MBR 302, 402. Other optional steps include operating the aerobic MBR 302, 402 at a volatile suspended solids concentration (VSS) of least about 7 g/l and a corresponding total suspended solids (TSS) concentration of at least about 8 g/l, and reducing at least about 70% of volatile suspended solids from aerobic MBR 302, 402 in the anaerobic digester system 305, 405 resulting in production of a recoverable fuel product.

Optionally, the process may further comprise the step of controlling the temperature of the anaerobic digester system 302, 405 in a range of between about 30 to about 35° C. In the process as shown generally in FIGS. 3 and 4, wasting from the aerobic MBR 302, 402 to the anaerobic digester system 305, 405 is optionally continuous, intermittent or discontinuous, direct or indirect. Further, the process may include the step of filtering activated sludge from the aerobic MBR 302, 402 in an external membrane separator 402b, as shown in FIG. 4, or a membrane separator submerged in the mixed-liquor contents of the MBR 302, 402.

The process according to this aspect of the invention may also optionally include further treatment steps, including removing and recovering phosphorus from the wastewater, which may also include returning a backwash formed in the removing and recovering phosphorus steps to the MBR 302, 402, and removing and recovering ammonia from the wastewater. The process may also include pretreatment steps, including for example, the step of pretreating the wastewater prior to being introduced into the MBR 302, 402.

In yet another aspect, the invention provides a method for retrofitting a wastewater treatment system for enhanced removal of organic and inorganic compounds in which the wastewater treatment system 300, 400 has an aerobic membrane bioreactor 302, 402. The retrofitting method includes connecting an anaerobic digester system 305, 405 to an aerobic MBR 302, 402 to receive wasted solids from the aerobic MBR 302, 402, and also connecting the anaerobic digester system 305, 405 to the aerobic MBR 302, 402 to return the anaerobic digester effluent stream 306, 406 to the aerobic MBR 302, 402. With specific reference to the exemplary embodiment illustrated schematically in FIG. 3, an embodiment of the present invention provides a system 300 having a wastewater stream 301, following screening and grit removal (not shown), fed to a MBR 302 for CBOD and TSS removal. Treated effluent 312 from the MBR 302 is then further treated for removal of the remaining phosphorus and nitrogen based compounds. Suitable methods for removal of such phosphorus and nitrogen compounds can be those commonly used for such removal, such as reverse osmosis, ion exchange, and other physical-chemical separation systems or biological systems, that may be known to those of ordinary skill in the art.

Downstream of the MBR 302, organic matter removed from the wastewater in the MBR 302 as wastewater particulates, cell mass formed from the removal of organic matter present in the wastewater, and wastewater organic matter absorbed onto the solids present in the MBR 302, are fed to anaerobic digester system 305 via solids wasting stream 304. In the anaerobic digester system 305, the wastewater particulate and cell mass organic matter are converted to a recoverable fuel product, such as methane, in digester system product stream 307. Residual solids are removed, as shown in FIG. 3, via solids disposal stream 308. The digester system effluent is recovered in digester system effluent stream 306 and is recycled directly back to the MBR 302, which includes mixing the digester system effluent stream 306 with the wastewater feed stream 301.

In another embodiment, as shown in FIG. 4, the system 400 includes a wastewater feed stream 401, following screening and grit removal (not shown), fed to a MBR 402, comprising a bioreactor 402a and an external membrane separator 402b, for CBOD removal. The MBR 402 is operated under aerobic conditions. Following the treatment in bioreactor 402a, the mixed-liquor stream 403 from the bioreactor is fed to an external membrane separator 402b for removal of particulate, colloidal, and other high molecular weight compounds. Concentrate from the membrane separator 402b is recycled back directly to either the MBR 402a via recycle stream 410, or mixed with the treated wastewater stream 403 via membrane recycle stream 411, or both. In certain alternative embodiments, solids may instead be wasted from either line 410 or 411 to the anaerobic digester. The concentration of solids at these locations is near equivalent to that in 402a. The bioreactor 402a and the membrane separator 402b form the first unit process, the MBR 402, of this embodiment.

The second unit process of this embodiment is an anaerobic digester system 405. Wastewater particulates, cell mass formed from the removal of organic matter present in the wastewater, and wastewater organic matter absorbed onto the solids present in MBR 402, are fed to the anaerobic digester system 405 via solids wasting stream 404 from the MBR 402. In the anaerobic digester system 405, the wastewater particulate, cell mass and absorbed organic matter is converted to a recoverable fuel product, such as methane, which is recovered as digester system product stream 407. Residual solids are removed, as shown in FIG. 4, via solids disposal stream 408 for collection and disposal. The digester system effluent 406 is recovered and recycled directly back to MBR 402a, including mixing the effluent stream 406 with the wastewater feed stream 401.

In order to afford near complete treatment of the wastewater and removal of undesirable contaminants, the wastewater treatment system 400 according to this exemplary embodiment further includes third and fourth unit processes, including phosphorus removal-recovery system 414 and ammonia removal-recovery system 418. Following membrane separation, the permeate stream 412 from the membrane separator 402b is fed to a next unit process, the phosphorus removal-recovery system 414. Optionally included as part of the third unit process, permeate stream 412 is mixed with a chemical additive fed from chemical addition source 413. After chemical addition, if included, the permeate stream 412 is fed to phosphorus removal-recovery system 414, in which phosphorus is removed and recovered as phosphorus product stream 415. The treated wastewater from the phosphorus-removal recovery system 414 is recovered as effluent stream 416. Optionally, backwash is returned to MBR 402 via backwash recovery stream 417. Returning backwash to the MBR 402 may provide enhanced performance of the membrane separator 402b.

In the fourth unit process, ammonia is removed, for example, from phosphorus effluent stream 416 by treating the effluent in the ammonia removal-recovery system 418. As with the phosphorus removal-recovery system 414, ammonia removed from the effluent is recovered as product stream 419. Optionally, backwash is returned to the MBR 402 via return stream 421 and the effluent from the ammonia-removal recovery system, product stream 420, comprises the treated wastewater having near complete removal of CBOD, TSS, TN and TP. This product stream 420 may optionally be disinfected (not shown) using techniques known to those of ordinary skill in the art.

It is also contemplated that the fourth unit process could also include an ammonia removal system comprising, for example, one or more biological systems. In such a system, ammonia would be removed, for example, from the phosphorus effluent stream 416 by conversion of the ammonia into nitrogen gas in the secondary biological system(s). Such nitrogen gas may or may not be recovered.

It should be noted that while FIG. 4 illustrates the phosphorus removal-recovery system 414 upstream of the ammonia removal-recovery system 418, the system is not limited to this configuration. For example, the phosphorus removal-recovery system 414 may be included downstream of the ammonia removal-recovery system 418. Further, both the phosphorus removal-recovery system 414 and the ammonia removal-recovery system 418 as illustrated may be designed so as not to recover any product. In such embodiments, these systems are included to achieve only phosphorus and/or ammonia removal.

Each of the above-described unit processes will now be described in further detail and with reference to exemplary embodiments. As noted above, the descriptions provided have been selected as illustrative of exemplary embodiments of the invention. These embodiments, however, should not be considered as the only embodiments contemplated as within the scope of the invention.

According to an embodiment of the present invention, the first unit process is an MBR. The MBR is operated under aerobic conditions (e.g., bulk liquid dissolved oxygen 0.5 mg/l or greater) and at a low mean cell residence time (MCRT) or solids retention time (SRT). Preferably, the MBR is controlled in a range between about 1 to about 5 days, and more preferably, in a range between about 1 to about 3 days.

Preferably, the bioreactor is a high yield, suspended growth, aerobic MBR. The MBR is designed at a high biomass concentration, normally measured as volatile suspended solids (VSS) concentration, preferably of at least 7 g/l, and a corresponding TSS concentration, preferably of 8 g/l or greater. However, it is undesirable to operate the MBR at a TSS concentration above 20 g/l. This is because above 20 g/l, the viscosity of the liquor, or activated sludge, in the bioreactor impedes the performance of the MBR as it becomes more difficult for oxygen to be dissolved into the liquor and impedes the performance of the membrane separator. The combination of control at a low SRT and design at a high VSS translates to an MBR having a high-rate or high efficiency with respect to the removal of CBOD.

The bioreactor of the MBR is coupled to a membrane separator designed to remove TSS, particulate and colloidal CBOD, particulate and colloidal TKN, particulate and colloidal TP and any other pollutants of a size that can be removed by filtration through a membrane. Preferably, the pore size of the membrane of the membrane separator is about 0.01 microns or larger (e.g., for removal of higher molecular weight compounds). The membrane separator allows operation of the bioreactor at a high TSS concentration. Further, the small size of the membrane pores optionally ensures absolute or near absolute retention of the reactor biomass and removal of various particulate, colloidal and other higher molecular weight compounds and absolute control of the reactor SRT. Provided the bioreactor is operated at a sufficient SRT to achieve soluble CBOD removal, the MBR system will provide near complete removal of CBOD without variation in treatment performance.

The membrane separator may be located submerged or immersed in the mixed-liquor contents of the MBR or external to the MBR. Exemplary membrane separators include both immersed and non-immersed membranes. In an immersed membrane configuration, in which the membranes are immersed in the mixed-liquor within the bioreactor vessel, activated sludge is contacted with outer surfaces of the membranes, and a treated water is removed from lumens of the membranes. Exemplary MBRs employing an immersed membrane separator are disclosed in U.S. patent application Ser. No. 11/110,148 to Jordan (the '148 application), published as Publication No. 2006/0201876, which is incorporated by reference in its entirety herein.

Alternatively, an exemplary type of external membrane separator suitable for use in the present invention is a cross-flow membrane filter. In the configuration of this separator, mixed-liquor (e.g., activated sludge) from the reactor is contacted with the lumen side of the membrane flowing through tubes or channels and the treated water is extracted and removed through membranes. It is noted that although either membrane configuration can be utilized, the external non-immersed configuration may be less impacted by operating the bioreactor at a short versus long SRT. Although there are technical advantages achieved through use of the non-immersed versus immersed membrane configurations including more stable membrane performance, simpler routine operation, a less complex membrane cleaning strategy and anticipated longer membrane life, economics are likely to favor application of the immersed configuration at higher wastewater flow rates (i.e., greater than 2 mgd). One example of an external membrane separator suitable for use in embodiments of the present invention is that which is offered by Parkson Corporation of Fort Lauderdale, Fla. as part of the Dynalift™ MBR.

The biological mechanisms in the MBR responsible for CBOD removal include conversion of organic carbon into cell mass, absorption of organic carbon onto the TSS present in the reactor, and oxidation of the organic carbon. The bioreactor is purposely operated/controlled near the minimum SRT to achieve growth of organisms only responsible for CBOD removal. In addition to this feature, the MBR is designed to operate at a high TSS concentration and under completely or substantially completely aerobic conditions to achieve significant advantages and benefits.

For example, operation at a low SRT and high TSS concentration maximizes the mass of organic matter present in the wastewater that is converted to cell mass (i.e., high cell yield) and/or absorbed onto the TSS in the reactor. The result is that a significantly larger fraction of the organic matter present in the wastewater is transferred to the anaerobic digester system through solids wasting. This ultimately translates to a large fraction that is converted to an energy source, for example, in the form of methane, than would be characteristic of the bioreactors designed for use in more conventional treatment systems.

Another advantage is that operation at a low SRT and high TSS concentration minimizes the size of the required bioreactor, resulting in lower equipment and installation costs for new plant construction. For example, if an existing plant requires upgrading, the required bioreactor volume will typically be at least 50 percent of the existing reactor volume, therefore potentially freeing up tankage for other purposes (e.g., tankage for wastewater equalization or as part of an anaerobic digestion system).

Yet another benefit is that the bioreactor is purposely designed and operated at a low SRT to eliminate or inhibit the growth of organisms responsible for nitrification (i.e., nitrifiers) and enhanced biological phosphorus uptake (i.e., polyphosphate-accumulating organisms (PAOs)). Relative to the organisms responsible for CBOD removal, the organisms responsible for these processes are much fewer in number and require more specific conditions to ensure their growth (e.g., they are more sensitive to temperature, pH and dissolved oxygen (DO); grow at a slower rate, e.g. require a longer SRT; nitrifiers are often sensitive to a variety of inhibiting compounds; PAOs require certain volatile fatty acid compounds normally not present in sufficient concentrations in the wastewater).

In addition, operation at a lower SRT minimizes the mass of organic matter oxidized as compared to that converted to cell mass, and eliminates or inhibits the oxygen requirements associated with ammonia oxidation or nitrification. Lower oxygen requirements translate to potentially lower energy costs for oxygen transfer and lower related equipment costs. By operating the MBR under completely or substantially completely aerobic conditions, the design of the reactor vessel is simplified and the need for components and/or additional vessels to achieve the alternating aerobic, anoxic and anaerobic zones, as in the system shown in FIG. 2, to achieve nitrification, denitrification and biological P removal is substantially eliminated. Preventing nitrification eliminates or reduces the potential generation of nitrous oxide, a greenhouse gas with a serious impact on the environment. This feature differentiates this embodiment of the present invention from conventional systems that are designed, for example, with aerobic and non-aerobic zones or stages of the MBR bioreactor vessel to achieve nitrogen removal. This simplifies the MBR design, as nitrogen removal can be accomplished, for example, downstream of the MBR treatment step.

Furthermore, operation at a low SRT minimizes or reduces the production of soluble microbial products (SMPs) resulting from cell decay. The presence of a higher concentration of SMPs generally reduces the efficiency (i.e., flux per unit of applied pressure) of membrane separation. It is also acknowledged, that operating an MBR at a low bioreactor SRT and high TSS concentration could result in an increase in the viscosity of the liquid in the bioreactor and the presence of a higher concentration of slowly biodegradable colloidal compounds. Generally, these conditions can reduce membrane efficiency. It is theorized, however, that any such reduction in efficiency would be minor compared to the overall benefits and advantages, as discussed herein, made possible by the present invention.

Precise control of the SRT is beneficial when the MBR is designed to achieve only CBOD removal. The MBR system allows precise SRT control as wasting is performed, for example, directly from the suspended growth reactor and preferably on a continuous basis. Controlling the SRT of the MBR system bioreactor simply requires wasting a volume fraction of the reactor contents. For example, to achieve a 5-day SRT, the daily volume fraction wasted to the anaerobic digester system would be one fifth of the MBR volume. A valve or pump can be set to waste at a rate corresponding to a volumetric flow rate for achieving the desired SRT. In biosystem flow sheets such as, for example, those illustrated in FIGS. 1 and 2, solids wasting is optionally made from a clarifier (e.g., solids recycle stream), is typically done on an intermediate basis, and requires knowledge of the solids concentration in the solids recycle stream from the clarifier and in the bioreactor.

The second unit process according to the present embodiment comprises an anaerobic digestion system. In one exemplary embodiment, the wasting is on a continuous basis, i.e. at substantially steady-state conditions, to help maintain stable biomass growth conditions in the bioreactor of the MBR system. More preferably, wasting is continuous and directly from the MBR to the anaerobic digestion system, to maintain stable feed conditions to the digester system and to eliminate the need for any intermediate thickening or other processing steps. Further, by not incorporating such steps, the flow sheet is simplified, translating to lower equipment, instrumentation and control costs, and related manpower costs for operation and maintenance. However, solids from the MBR can also be wasted intermittently or semi-continuously, for example in batches, or indirectly, such as once per day to the anaerobic digester system. Effluent from the digester system is routed back to the MBR. Moreover, simplifying the flow sheet and providing stable feed conditions for the digester favors application of anaerobic digestion even at smaller wastewater treatment plants, in contrast to the aerobic digestion systems utilized for wasted solids treatment, for example, as shown in FIGS. 1 and 2.

An exemplary feature of the anaerobic digestion system is that the digester selected for use is categorized as having high performance. That is, the digester accomplishes a high degree of feed volatile solids destruction (e.g., conversion of 70 percent or greater) and organics destruction, and subsequently a high degree of soluble organics conversion to recoverable fuel products, for example as methane. These high performance characteristics translate to the generation of a minimal quantity of residual solids from the complete treatment system requiring disposal, minimizes or reduces the concentration of TSS and soluble organics returned to the MBR system bioreactor, and maximizes or improves the energy efficiency of the complete treatment system.

An exemplary high performance anaerobic digestion system suitable for use in the present invention is the BioTerminator 24/85 high rate anaerobic digester from Total Solids Solutions, LLC of Monroe, La. Such a digester is also described in detail in U.S. Pat. Nos. 4,885,094 and 6,673,243, which are incorporated by reference herein. The digester is preferably operated at a mesophilic temperature in the range of about 30 to about 35° C. but may also be operated under other temperature conditions, such as thermophilic temperatures in the range of 48-55° C. Alternatively, the anaerobic digestion system may be an embodiment comprising a conventional or a high performance digester coupled with pretreatment, such as sonication, focused pulsed technology, homogenization, microwave irradiation, or chemical additives, to increase the performance of the conventional or a high performance digester to achieve an exemplary conversion of 70 percent or greater.

In order to afford complete or substantially complete treatment of the wastewater and removal of undesirable contaminants, in an embodiment of the invention, the wastewater treatment system further includes a phosphorus removal and optional recovery system and an ammonia removal and optional recovery system. As noted previously, phosphorus removal and optional recovery can be performed either upstream or downstream of the ammonia removal and optional recovery system.

According to an embodiment including both phosphorus removal and recovery, the phosphorus removal-recovery system comprises a physical-chemical unit process designed to provide near complete removal of all TP present in the effluent from the MBR system and convert it to a product for reuse (e.g., agricultural fertilizer product or a product component). A number of physical-chemical treatment systems could be selected for this step, including, for example, sand filtration with chemical addition or ion-exchange systems. Exemplary phosphorus removal systems suitable for use in the present invention are also described in U.S. patent application Ser. Nos. 10/727,963 and 11/171,002, published as Publication Nos. 2004/0144728A1 and 2006/0000785A1, respectively, which are each incorporated in their entirety by reference herein.

In an embodiment of the present invention, sand filtration with chemical addition (e.g., ferric chloride) is used to accomplish phosphorus removal-recovery. This system functions only to remove phosphorus, versus TSS and TN (i.e., nitrate and/or nitrite through denitrification), as is the case in the flow sheet, for example, shown in FIG. 2. Use of a sand filter system minimizes or reduces filter size and chemical requirements, resulting in lower capital and operating costs.

The mechanisms for phosphorus removal using sand filtration include both phosphorus adsorption onto chemically coated sand grains and sand filtration of chemically precipitated phosphorus solids formed at the point of chemical addition. Further, MBR system separation is performed on all precipitated or absorbed/adsorbed phosphorus in the return stream removed from the sand filter as a result of filter backwashing. In addition, membrane separation is performed on all precipitated or absorbed/adsorbed phosphorus formed as a result of returning the sand filter backwash to the bioreactor system.

It is also contemplated, however, that the removal of phosphorous does not require the recovery of the phosphorous.

For the ammonia removal and optional recovery, in an embodiment of the invention including both removal and recovery, the ammonia removal-recovery system comprises a physical-chemical unit process where the ammonia is converted to a product for reuse (e.g., agricultural fertilizer product or a product component). In embodiments where the ammonia removal-recovery system is located downstream of the other unit processes, essentially the only TN in the feed to the ammonia removal-recovery step, is ammonia. This is because in the upstream bioreactor system according to this embodiment, near complete conversion of the wastewater TN components to ammonia occurs or certain TN components have been removed by membrane filtration (e.g., particulate TKN not hydrolyzed in the bioreactor system). Thus, such an embodiment illustrates the surprisingly effective synergy between the various unit processes that is made possible by aspects of the present invention.

A number of physical-chemical treatment systems could be selected for this step including, for example, ion-exchange and air stripping-absorption systems. It is contemplated that use of these systems may require some type of feed adjustment (e.g., pH alteration). The lack of pollutants in the feed stream at this location in the treatment system flow sheet, should translate to a cost-effective, physical-chemical system, such as ion-exchange or air stripping-absorption. Exemplary ion-exchange systems suitable for use in the present invention are ion-exchange systems for ammonia removal offered by Basin Water, Inc. of Rancho Cucamonga, Calif.

Thus, wastewater treatment systems according to the present invention represent an improvement over conventional municipal and industrial wastewater treatment systems designed to achieve the removal of organic and inorganic compounds (e.g., biological suspended growth activated sludge systems designed to achieve secondary treatment plus biological and/or physical-chemical nutrient removal). For example, conventional biological treatment systems operate inefficiently, that is at low volumetric removal rates, thus the need for large, space-consuming treatment tankage is required. The conventional systems provide compromised and/or variable treatment performance particularly with respect to the removal of nitrogen and phosphorus. These conventional systems also generate large quantities of residual solids requiring disposal, they are resource consumers destroying the majority of the value associated with the compounds present in the wastewater (e.g., organic carbon compounds largely oxidized, nitrogen compounds oxidized or reduced), and they require substantial energy input. Thus, conventional systems are associated with high capital costs and significant increases in treatment plant operating costs.

For example, one exemplary conventional system is disclosed in the '148 application, which relates to "sludge digestion" in a membrane bioreactor vessel and which achieves sludge hydrolysis or solubilization of the organic solids, ultimately reducing the sludge/solids production at the expense of increased energy costs for aerobic oxidation of at least a portion of the solubilized organics (i.e., an energy sink).

In comparison, according to exemplary embodiments of the present invention, such as the preferred embodiments illustrated schematically in FIGS. 3 and 4, an improvement over conventional systems, such as the system disclosed in the '148 application, can be conferred because the fraction of organics in the wastewater that are converted to biomass solids is maximized by operating the MBR treatment step at a SRT up to less than one-fifth of that in conventional systems. A system according to preferred aspects of the present invention therefore improves or maximizes the fraction of the organic carbon in the wastewater that is recovered as energy in the form of recoverable fuel product, such as methane, generated in the anaerobic digester. It also makes it possible to reduce the volume of the system's MBR as compared to a conventional MBR by a factor approximately equivalent to the difference in the SRT of the MBR as compared to conventional MBRs. In some circumstances, this can include a reduction of one-fifth or more.

The cell or biomass solids and other solids originating in the wastewater feed (e.g., colloidal organic solids), which are captured by the membrane component of the MBR, are wasted from this treatment step to an efficient, high performance, anaerobic digestion step. Wasting occurs preferably on a continuous or a less frequent (e.g., daily) basis to maintain close SRT control at a low value (e.g., 1 to 3 days), thereby maximizing biomass production and preventing or minimizing ammonia oxidation. In the digestion step, the organic fraction of the solids are solubilized and a large fraction of those solubilized organics are converted to methane (i.e., an energy source), as noted above. The digestion step according to exemplary embodiments of this invention not only produces energy but is anticipated to operate at a hydraulic retention time (HRT) as low as or even less than one-fifth of that typically associated with a conventional sludge hydrolysis vessel, such as the one disclosed in the '148 application or a conventional anaerobic digester.

In addition, there are fewer unit operations or treatment steps and associated components making up the system according to exemplary embodiments of the present invention, in comparison to conventional systems, such as that disclosed in the '148 application.

For example, it is noted that some conventional systems currently used for treating wastewater to achieve the degree of treatment intended by the present invention include both aerobic and non-aerobic (i.e., anoxic and/or anaerobic) treatment zones or reactor stages. In these systems, the MBR bioreactor vessel requires a number of reactor internal components (e.g., mixing and aeration components, zone or stage dividing walls). In addition, there is a need for closer operator attention, and more instrumentation and control (I&C) equipment to maintain the required environmental conditions (e.g., dissolved oxygen or oxidation-reduction potential) in the treatment zones.

In contrast, in a preferred embodiment of the present invention, the bioreactor vessel of the MBR comprises a single tank, aerated to maintain a minimum dissolved oxygen concentration of at least about 0.5 mg/l. In this embodiment, there are no internal vessel structures and the only internal component is an aeration device. The reactor SRT is controlled automatically by simply wasting a fixed volume of the reactor contents (i.e., mixed-liquor solids) preferably continuously from the MBR treatment step to the sludge treatment step. Continuous wasting of the reactor contents results in precise SRT control enhancing MBR operating and performance stability. In comparison, in conventional systems operated to maintain a pre-selected concentration of biological solids, continuous wasting of a fixed volume of the reactor contents would be undesirable because it would result in a variation of the reactor SRT as a result of variations in the influent wastewater flow and concentration characteristics.

In addition, in an embodiment of the present invention in which the anaerobic digester system includes a single tank, the anaerobic digester vessel is partitioned via the use of baffles to promote plug flow hydraulic conditions, which are known to enhance anaerobic digester performance. Continuous feeding of the digester as a result of continuous wasting of mixed-liquor solids from the MBR system, is expected to enhance digester operating and performance stability. The only significant control requirement for the anaerobic digester in these embodiments is optionally heating the wasted solids and maintaining a suitable temperature of the anaerobic reactor, preferably in the range from about 30° to about 35° C. In this way, instrumentation and control for such a system is simplified.

For example, the only major unit operations or treatment steps and related components associated with certain embodiments of the present invention's system MBR and anaerobic digester system are: screening steps to remove trash and debris from the influent wastewater and from the mixed-liquor, gas handling and utilization equipment associated with the anaerobic sludge digester, and the MBR vessel aeration device and the sludge digester temperature control equipment.

Thus, many benefits of the various embodiments of the present invention, translating to significant economic benefits relative to conventional systems are possible. These economic benefits are anticipated even when embodiments including physical-chemical or biological, post-treatment steps required to accomplish phosphorus and nitrogen removal, are considered. For example, the benefits may include one or more of the following advantages:

1) Reduction in treatment plant footprint.

2) A significant reduction in the number and mechanical complexity of the treatment steps and associated components making up the treatment plant flow sheet. This reduction translates to fewer vessel and equipment requirements.

3) Fewer and less complex treatment vessels and equipment components, translating to reduction of equipment maintenance and replacement, and in manpower savings for treatment system operation and maintenance.

4) Maximization of the fraction of organics in the wastewater feed that are converted to methane in the anaerobic digester (e.g., through conversion to biomass and/or membrane capture), significantly reduces the energy requirements for wastewater treatment and thus energy consumption.

5) The high performance characteristics of the anaerobic digester translate to the generation of significantly less residual solids requiring disposal.

6) Precise SRT control of the MBR through continuous or near continuous solids wasting and resultant continuous or near continuous feeding of the anaerobic sludge digester, leads to stable process operation and consistent performance. The result is the need for less operator attention to deal with process problems in order to maintain required performance, translating to manpower savings.

7) Flexibility of operating with or without phosphorus and/or nitrogen removal for "seasonal" operation of the system. That is, in regions having, for example, summer months with relatively higher temperatures, phosphorus and/or nitrogen in the wastewater treatment system effluent can encourage algal growth in, for example, rivers receiving the discharged effluent. Thus, during these warm periods, the system can desirably be operated utilizing phosphorus and/or ammonia recovery unit processes to avoid such algal growth. However, during months having temperatures too cold for algal growth in such rivers, the system can easily be transitioned to operate without or with partial phosphorus and/or nitrogen removal.

As a result of the many advantages associated with exemplary embodiments of the present invention, it is contemplated that many existing wastewater treatment systems will be modified to incorporate the various aspects of the present invention. Therefore, in yet another aspect, the invention provides a method for retrofitting a wastewater treatment system for enhanced removal of organic and inorganic compounds having an aerobic membrane bioreactor. The method includes the steps of connecting an anaerobic digester system to an aerobic membrane bioreactor to receive wasted solids from the aerobic membrane bioreactor and connecting the anaerobic digester system to the aerobic membrane bioreactor to return the anaerobic digester effluent stream to the aerobic membrane bioreactor The invention also includes further alternative embodiments, such as those exemplified in FIGS. 5 and 6. In the exemplary embodiments shown in FIGS. 5 and 6, the invention provides a wastewater treatment system 500, 600 comprising an aerobic MBR system 502, 602 and an anaerobic digester system 505, 605 connected to receive wasted solids from the aerobic MBR 502, 602. The anaerobic digester system 505, 605 is also connected to return effluent from the anaerobic digester system 505, 605 to the aerobic MBR system 502, 602.

Figure 5:
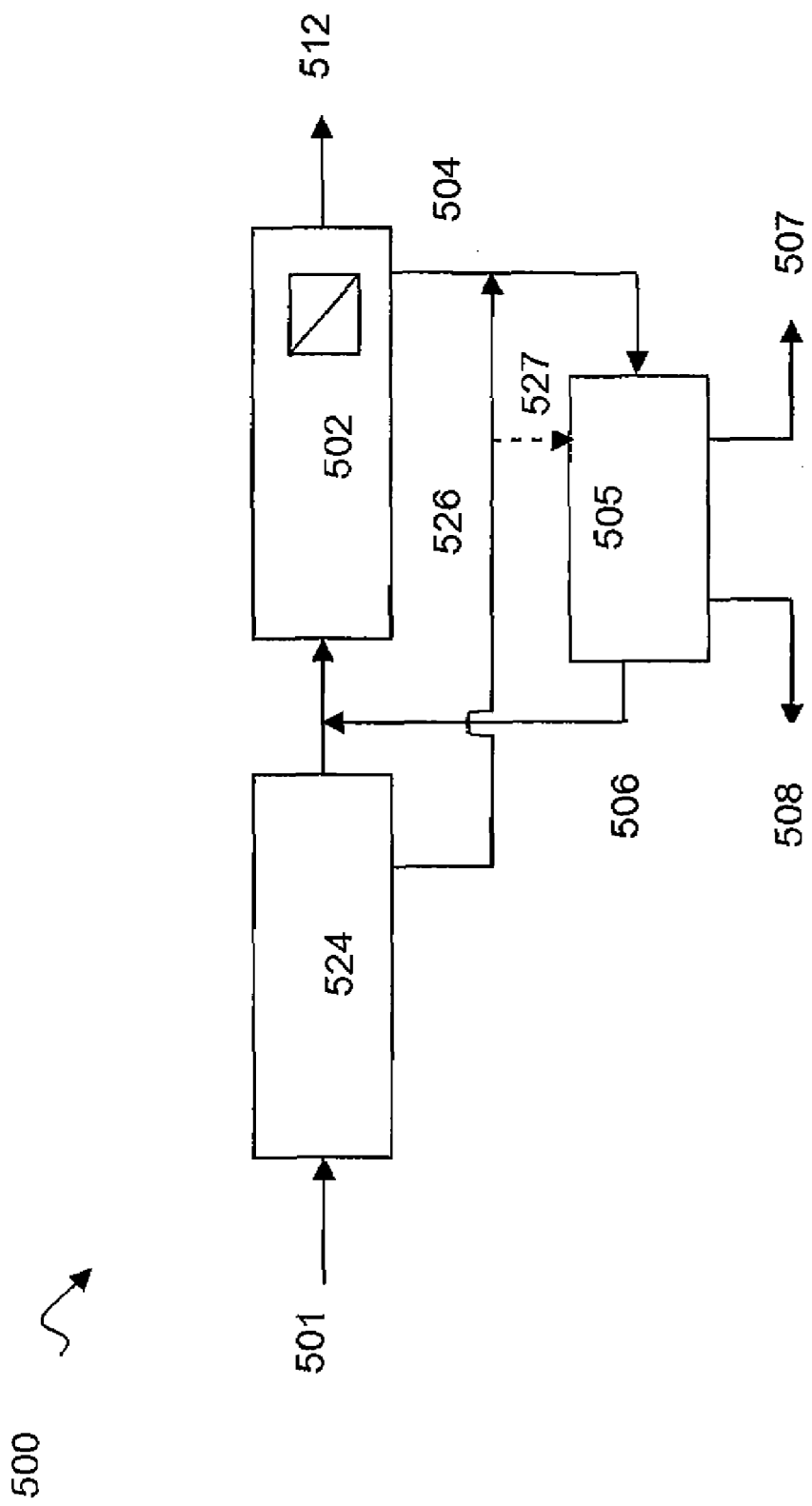
FIG. 5 is a simplified flow diagram of an embodiment of a wastewater treatment system according to another exemplary aspect of the present invention.

As illustrated in the exemplary embodiment of FIG. 5, the wastewater, which may optionally follow pretreatment, such as grit removal, 501 is fed to high performance primary treatment filter system 524. The term "primary treatment" is defined herein as describing fine screening using screen or sieve sizes, for example, of about 100 microns to about 1000 microns. By "high performance," the term is used to describe a minimum of about 50% removal of total suspended solids. The treated wastewater effluent from high performance primary treatment filter system 524 is fed to aerobic MBR system 502. Once treated in the aerobic MBR system 502, similar to the embodiments shown in FIGS. 3 and 4, the wasted solids are recovered in stream 504 and are fed to anaerobic digester system 505. As shown, in the anaerobic digester system 502, the wastewater particulate and cell mass organic matter in the wasted solids stream 504 are converted to a recoverable fuel product, such as methane, in digester system product stream 507. In this embodiment, substantially all wasted solids recovered from the MBR in stream 504 is biomass. Residual solids are removed from the anaerobic digester system 505, as shown in FIG. 5, via solids disposal stream 508. The digester system effluent is recovered in digester system effluent stream 506 and is recycled, optionally directly, back to the MBR system 502. Similar to FIGS. 3 and 4, the wastewater treatment system 500 may also optionally comprise a phosphorus removal and/or recovery system, such as that shown in FIG. 4 as 414, and further may optionally comprise, as shown in FIG. 4, an ammonia removal and/or recovery system 418 from the MBR effluent stream 512.

As shown in the embodiment illustrated in FIG. 5, the digester effluent stream 506 is mixed with primary treatment filter effluent rather than the wastewater feed stream 501. Although not shown, stream 506 could also be returned to MBR 502 directly. The high performance primary treatment filter system 524 provides an underflow stream 526 containing particulate organic carbon filtered from the wastewater 501. This underflow stream 526, or primary solids stream, is either combined with the wasted solids stream 504 (for example, if dilution is required), or optionally sent directly, to the anaerobic digester 505.

Figure 6:
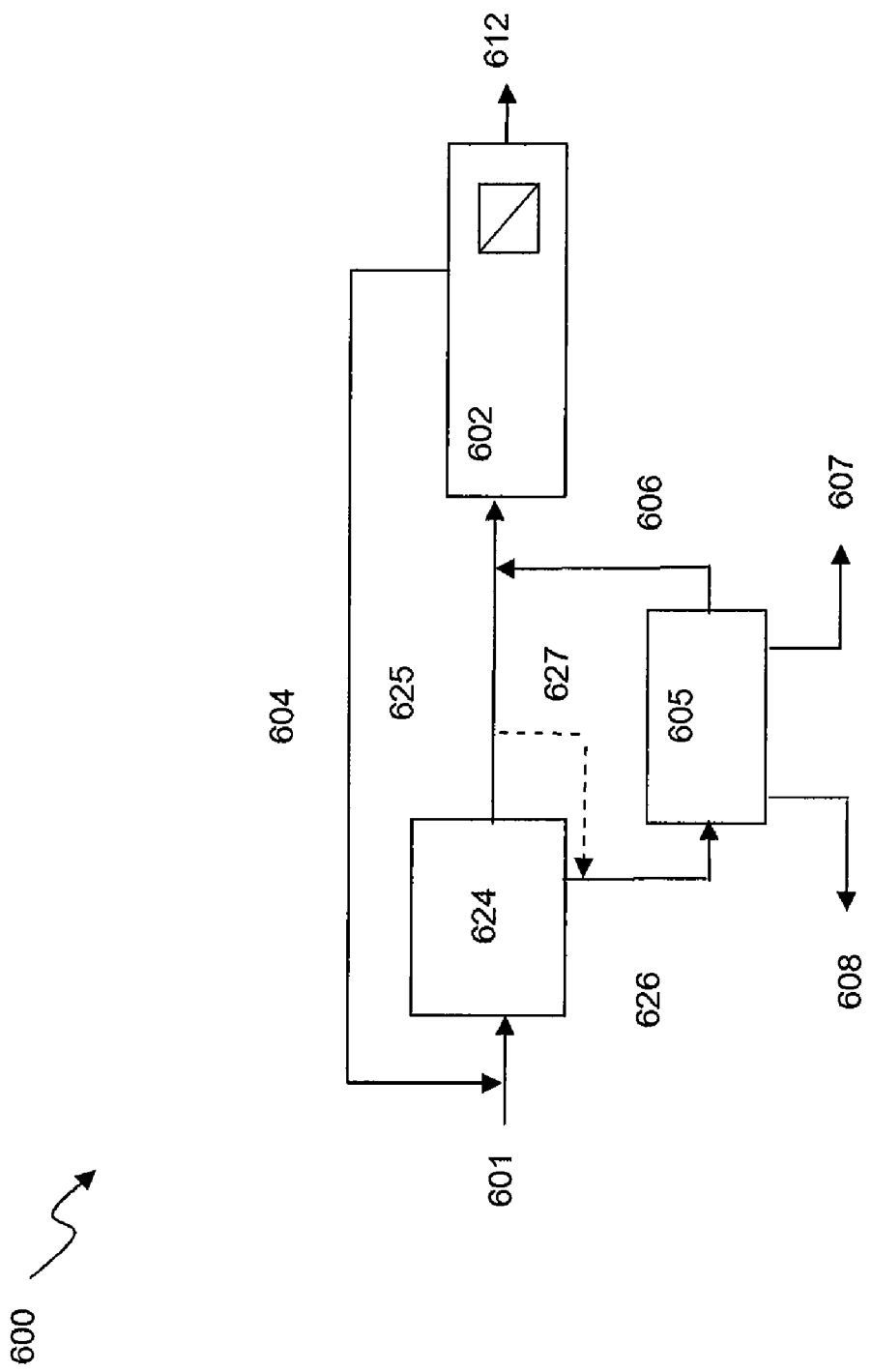
FIG. 6 is a simplified flow diagram of another embodiment of a wastewater treatment system according to yet another exemplary aspect of the present invention.

In an alternative embodiment, exemplified in FIG. 6, the wastewater treatment system 600 includes a high performance primary treatment filter system 624 for treating wastewater feed stream 601, optionally following grit removal, and, once filtered, is further treated by aerobic MBR system 602. As with the embodiments of FIGS. 3, 4 and 5, the wastewater treatment system 600 may also optionally comprise a phosphorus removal and/or recovery system and/or an ammonia removal and/or recovery system for treating the MBR effluent stream 612.

In the exemplary embodiment illustrated in FIG. 6, the wasted solids stream 604 is returned to be combined with the feed stream 601 or directly to the high performance primary treatment system 624 for treatment in the high performance primary treatment filter system 624. The underflow stream 626 from the high performance primary treatment filter system 624 thus includes primary solids, including organic carbon, as well as secondary biomass from the wasted solids stream 604. This underflow stream 626 is fed to the anaerobic digester 605 for converting the carbon-containing portion of the stream to a recoverable fuel product, such as methane. Such product is shown in FIG. 6 as being recovered in digester system product stream 607. Residual solids, as with the embodiments illustrated in FIGS. 3, 4 and 5, are removed via solids disposal stream 608, while the digester system effluent is recovered in digester system effluent stream 606 for feeding to the aerobic MBR system 602. Optionally, it may be combined with the primary treatment filter effluent 625. If required, the underflow stream 626 from the high performance primary treatment filter system 624 can be diluted with a portion of the primary treatment effluent stream, indicated in FIG. 6 as optional stream 627.

In the exemplary embodiments of the present invention involving the inclusion of a high performance primary treatment filter system 524, 624, respectively, such as shown in FIGS. 5 and 6, the primary treatment system is utilized to achieve fine screening, such as screen or sieve sizes ranging from about 100 microns to about 1000 microns of the wastewater as shown in FIG. 5, or the wastewater plus solids wasted from the downstream aerobic MBR as shown in FIG. 6, and the production of concentrated solids, such as primary solids 526, 626 (i.e., total solids (TS) concentration 0.5 to 30 percent) underflow stream from the filter treatment system 524, 624.

The high performance primary treatment filter system for use in the present invention may comprise high performance particle separation such as gravity separation, filtration separation or flotation separation. One example of high performance filtration separation includes a continuous rotating belt sieve designed to achieve separation of particulate matter from the feed stream, combined with an auger or screw press designed to dewater the separated particulate matter. One example of such a device is the Salsnes Filter commercially available from Blue Water Technologies, Inc. of Hayden, Id.

The high performance primary treatment filter system achieves substantial removal of solids from the feed, such as, for example, a range of about 30 to about 70 percent TSS removal and removal of the organics associated with those solids The filter system achieves fine screening of the wastewater which can protect the downstream membrane component of the MBR system. Similar to the embodiments exemplified in FIGS. 3 and 4, the embodiments exemplified in FIGS. 5 and 6 achieves an increase or a maximization of the organic carbon matter in the wastewater that is fed to the anaerobic digester in the form of particulate organic carbon captured in the MBR, and cell mass formed or wastewater organics absorbed onto the solids in the MBR. In addition, in the embodiments exemplified in FIGS. 5 and 6 respectively, these same mechanisms with the addition of organic removal achieved in the filter system increase or maximize the fraction of organic carbon present in the wastewater that is fed to the anaerobic digester.

In the embodiments exemplified in FIGS. 5 and 6, the aerobic MBR 502, 602 is operated at an SRT in a range of about 1 to about 5 days, and preferably in a range of about 1 to about 2 days, to maximize the organic carbon in the feed to the MBR that is converted to cell mass, and to minimize cell mass decay. It is expected that the removal of particulate organic carbon in the filter system as compared to formation of cell mass in the downstream aerobic MBR will increase or maximize the mass of organic carbon originally present in the feed streams 501, 601, as shown respectively in FIGS. 5 and 6, fed to the anaerobic digester resulting in more organic carbon (rather than cell mass) converted to methane and at a faster rate than for embodiments, for example, as exemplified in FIGS. 3 and 4.

The high performance primary treatment filter system can be designed and/or operated to produce a concentrated solids (e.g., TS 5 to 10 percent) underflow stream from the system, as described above. This underflow stream will be directed to the anaerobic digester, as depicted in FIGS. 5 and 6. This anaerobic digester feed stream has a high TS content and accomplishes a high degree of volatile solids destruction and organic carbon conversion to methane, or high performance digestion.

The capital requirements of certain high performance digestion systems are believed to be reduced when the feed stream has a TS concentration of 5 percent or greater.

The high performance primary treatment filter system can be designed and/or operated to produce an underflow stream containing a TS concentration of up to 30 percent, as noted above. At these higher TS concentrations (e.g., 10 to 30 percent), the stream would likely require dilution and mixing to afford transfer (e.g., pumping) of the stream to the digester and in order for the stream to be amenable for processing in the digester. In the embodiment exemplified by FIG. 5, dilution can be accomplished by mixing the underflow stream with the wasted solids stream from the aerobic MBR. Alternative dilution methods can be practiced, such as use of effluent from the primary treatment filter as shown in FIG. 6.

In the embodiment exemplified in FIG. 6, the wasted solids from the aerobic MBR are directed to the primary treatment filter system. As compared to FIG. 5, the embodiment of FIG. 6 provides fine screening of the mixed-liquor contained in the aerobic MBR. In this case, the high performance primary treatment filter system can be designed and/or operated to produce an underflow stream containing a TS concentration of less than 10 percent. At higher TS concentrations, the stream may require dilution, for example effluent from the primary treatment filter as shown in FIG. 6, as well as mixing to afford transfer and processing of the stream anaerobically.

The high performance primary treatment filter system achieves substantial removal of solids (i.e., TSS) and associated organics (i.e., carbonaceous biochemical oxygen demand or CBOD) from the wastewater feed, as previously noted. This removal mechanism reduces the TSS and CBOD load to the MBR reducing the MBR volume or the concentration of biomass solids required to achieve and maintain the desired SRT, preferably in the range of from about 1 to about 5 days, or more preferably of from about 1 to about 2 days, and reduces the oxygen requirement to achieve biomass growth. This results in a reduced MBR volume. A reduced concentration of MBR biomass solids may also result in increased membrane efficiency. The fine screening component of the filter system may achieve substantial removal of fine organic particulates (i.e., colloidal organics) from the wastewater feed. These colloidal organics may be slowly biodegradable and their presence in the MBR can negatively impact membrane efficiency.

The reduced TSS and CBOD load to the MBR achieved by inclusion of the primary treatment filter system, reduces the MBR volume required or concentration of biomass solids required to achieve and maintain the low SRT of embodiments of the invention. By operating at a lower SRT, oxygen requirements are reduced and thus associated energy and equipment requirements for oxygen transfer are also reduced. It also eliminates or reduces potential generation of nitrous oxide, a greenhouse gas, that is typically associated with operating at longer SRTs that achieve nitrification in the MBR.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for treating wastewater comprising the steps of:
   wasting volume fraction of organic cell mass form an aerobic membrane bioreactor to an anaerobic digester system; and
   maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occurs;
   wherein the step of wasting from the aerobic membrane bioreactor to the anaerobic digester system is intermittent or discontinuous.

2. A process for treating wastewater comprising the steps of:
   wasting a volume fraction of organic cell mass from an aerobic membrane bioreactor to an anaerobic digester system; and
   maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occurs;
   further comprising the step of filtering activated sludge from the aerobic membrane bioreactor in a membrane separator external to the membrane bioreactor.

3. A process for treating wastewater comprising the steps of:
   wasting a volume fraction of organic cell mas from an aerobic membrane bioreactor to an anaerobic digester system; and
   maintaining a solids retention time(SRT) in the bioreactor that is (1) greater than a time needed to achieve growth of organisms suitable for converting carbonaceous biochemical oxygen demand (CBOD) into cell mass and (2) less than a time a which substantial decay of the organisms occurs;
   further comprising the steps of removing and recovering phosphorus from the wastewater.

4. A process for treating wastewater comprising the steps of: wasting a volume fraction of organic cell mass from an aerobic membrane bioreactor to an anaerobic digester system; and
   maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occurs;
   further comprising the steps of removing and recovering ammonia from the wastewater.

5. A process for treating wastewater comprising the steps of:
   wasting a volume fraction of organic cell mass from an aerobic membrane bioreactor to an anaerobic digester systems; and
   maintaining a solids retention time (SRT) in the bioreactor that is (1) greater than a time needed to achieve growth of organisms suitable for converting carbonaceous biochemical oxygen demand (CBOD) into cell mass and (2) less than a time at which substantial decay of the organisms occur;
   further comprising pretreating the wastewater prior to being introduced into the membrane bioreactor.

6. The process of claim 1, 2, 3, 4, or 5, wherein the step of maintaining the SRT includes controlling the SRT in a range between about 1 to about 3 days.

7. The process of claim 1, 2, 3, 4, or 5, further comprising the step of controlling a minimum dissolved oxygen concentration in the aerobic membrane bioreactor of at least about 0.5 mg/l.

8. The process of claim 1, 2, 3, 4, or 5, wherein the step of maintaining a SRT includes maintaining the SRT to minimize ammonia oxidation in the aerobic membrane bioreactor.

9. The process of claim 1, 2, 3, 4, or 5, further comprising the step of operating the aerobic membrane bioreactor at a volatile suspended solids concentration (VSS) of least about 7 g/l and a corresponding total suspended solids (TSS) concentration of at least about 8 g/l.

10. The process of claim 1, 2, 3, 4, or 5, further comprising the step of controlling a temperature of the anaerobic digester system in a range of between about 30 to about 35° C.

11. The process of claim 2, 3, 4, or 5, wherein the step of wasting from the aerobic membrane bioreactor to the anaerobic digester system is continuous.

12. The process of claim 1, 2, 3, 4, or 5, wherein the step of wasting is directly from the aerobic membrane bioreactor to an anaerobic digester of the anaerobic digester system.

13. The process of claim 1, 2, 3, 4, or 5, wherein the step of wasting is indirectly from the aerobic membrane bioreactor to an anaerobic digester of the anaerobic digester system.

14. The process of claim 1, 3, 4, or 5, further comprising the step of filtering activated sludge from the aerobic membrane bioreactor in a membrane separator submerged in mixed-liquor contents of the membrane bioreactor.

15. The process of claim 1, 2, 4, or 5, further comprising the steps of removing phosphorus from the wastewater.

16. The process of claim 3 further comprising the step of returning a backwash formed in the removing and recovering phosphorus steps to the membrane bioreactor.

17. The process of claim 5 further comprising pretreating the waste water with a screen or grit remover.

18. The process of claim 1, 2, 3, 4, or 5, further comprising filtering the wastewater prior to being introduced into the membrane bioreactor with a high performance primary treatment filter system.

19. The process of claim 1, 2, 3, 4, or 5, further comprising pretreating the wastewater with a screen or grit remover and filtering the wastewater with a high performance primary treatment filter system prior to the wastewater being introduced into the membrane bioreactor.

* * * * *

UNITED STATES PATENT AND TRADEMARK OFFICE
CERTIFICATE OF CORRECTION

PATENT NO. : 7,713,417 B2  Page 1 of 1
APPLICATION NO. : 11/966267
DATED : May 11, 2010
INVENTOR(S) : Paul M. Sutton It is certified that error appears in the above-identified patent and that said Letters Patent is hereby corrected as shown below:

Under claims in column 19, claim 3, line 3, "mas" should read --mass--.

Under claims in column 19, claim 4, line 2, should have a paragraph indentation after the word "of".

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,713,417 B2  Page 1 of 1
APPLICATION NO. : 11/966267
DATED : May 11, 2010
INVENTOR(S) : Paul M. Sutton It is certified that error appears in the above-identified patent and that said Letters Patent is hereby corrected as shown below:

Under claims in column 19, line 32 (claim 3, line 3) "mas" should read --mass--.

Under claims in column 19, line 44 (claim 4, line 2) should have a paragraph indentation after the word "of".

This certificate supersedes the Certificate of Correction issued October 12, 2010.

Signed and Sealed this

Ninth Day of November, 2010

David J. Kappos
*Director of the United States Patent and Trademark Office*